United States Patent [19]

Salz

[11] Patent Number: 5,620,261
[45] Date of Patent: Apr. 15, 1997

[54] BEARING BUSH AND METHOD OF MANUFACTURING THE BEARING BUSH

[75] Inventor: Robert Salz, Neustadt/Wied, Germany

[73] Assignee: Metzeler Gimetall AG, Breuberg, Germany

[21] Appl. No.: 519,124

[22] Filed: Aug. 24, 1995

[30] Foreign Application Priority Data

Aug. 24, 1994 [DE] Germany .................... 44 30 037.9

[51] Int. Cl.⁶ ................................................ F16C 17/02
[52] U.S. Cl. ................................. 384/276; 29/898.055
[58] Field of Search ........ 384/276; 29/898.04–898.059, 29/898.07–898.15

[56] References Cited

U.S. PATENT DOCUMENTS

| | | | |
|---|---|---|---|
| 4,570,315 | 2/1986 | Kramer | 29/898.055 |
| 4,577,379 | 3/1986 | Kramer | 29/898.055 |
| 4,677,721 | 7/1987 | Kramer | 29/898.055 |
| 4,718,959 | 6/1988 | Kramer | 29/898.055 |

*Primary Examiner*—Lenard A. Footland
*Attorney, Agent, or Firm*—Herbert L. Lerner; Laurence A. Greenberg

[57] ABSTRACT

A bearing bush, in particular for motor vehicles, includes an inner tube of metal having an outer contour. An intermediate tube of synthetic material rests against the inner tube so as to be slideable at least in a circumferential direction. The intermediate tube has an inner surface being shaped in accordance with the outer contour of the inner tube, and the intermediate tube has an outer surface. A vulcanized layer is applied onto the outer surface of the intermediate tube. A method of manufacturing the bearing bush includes inserting the inner tube and the intermediate tube into a vulcanizing mold together. The intermediate tube is deformed in accordance with an external contour of the inner tube during vulcanization.

2 Claims, 3 Drawing Sheets

BEARING BUSH AND METHOD OF MANUFACTURING THE BEARING BUSH

BACKGROUND OF THE INVENTION

Field of the Invention

The invention relates to a bearing bush and a method of manufacturing the bearing bush.

Known bearing bushes, which are used in particular in motor vehicles, have an inner tube made of metal, an outer tube which is likewise made of metal and surrounds the inner tube, and a vulcanized layer being provided between the inner tube and the outer tube.

SUMMARY OF THE INVENTION

It is accordingly an object of the invention to provide a bearing bush and a method of manufacturing the bearing bush, which overcome the hereinafore-mentioned disadvantages of the heretofore-known devices and methods of this general type, which provide an outer tube that is rotatable relative to an inner tube in the event of torsional stress and which provide for easy manufacture.

With the foregoing and other objects in view there is provided, in accordance with the invention, a bearing bush, in particular for motor vehicles, comprising an inner tube of metal having an outer contour; an intermediate tube of synthetic material resting against the inner tube so as to be slideable at least in a circumferential direction, the intermediate tube having an inner surface being shaped in accordance with the outer contour of the inner tube, and the intermediate tube having an outer surface; and a vulcanized layer being applied onto the outer surface of the intermediate tube.

Therefore, in the event of torsional stress, the inner tube may be twisted relative to the intermediate tube and to the vulcanized layer bonded to the intermediate tube. Such a bearing bush is of a particularly simple construction and is therefore easy to manufacture. Since the intermediate tube is made of plastic or synthetic material, it may already be inserted during vulcanization into the vulcanizing mold so that an adaptation of the intermediate tube to the external contour of the inner tube is effected as early as during the vulcanizing process. Advantageously, plastic or synthetic materials with low coefficients of friction, e.g. polyamide, are used for the intermediate tube.

In accordance with another feature of the invention, an axial locking of the intermediate tube and the parts connected thereto is achieved in a simple manner by providing the inner tube with an external contour which locks the intermediate tube in an axial direction.

In accordance with a further feature of the invention, the inner tube has at least one end bevel, against which the intermediate tube rests.

In the case of refinements of the invention as well, the intermediate tube is inserted into the vulcanizing mold as early as during vulcanization and is deformed in accordance with the external contour of the inner tube.

In accordance with an added feature of the invention, the inner tube has a curved external contour in order to enable a cardanic deflection of the intermediate tube resting against the inner tube.

In accordance with an additional feature of the invention, the vulcanized layer is formed with a laterally projecting sealing lip.

In accordance with yet another feature of the invention, in order to guarantee a particularly good bond with the vulcanized layer, the outer surface of the intermediate tube is provided with a bonding agent.

In accordance with yet a further feature of the invention, there is provided an outer tube being connected to the vulcanized layer. The outer tube may be made of metal but may alternatively be made of plastic or synthetic material or other materials.

With the objects of the invention in view, there is also provided a method of manufacturing a bearing bush, which comprises inserting an inner tube of metal and an intermediate tube of synthetic material resting against the inner tube and being slideable at least in a circumferential direction, into a vulcanizing mold together; deforming the intermediate tube in accordance with an external contour of the inner tube during vulcanization; and applying a vulcanized layer onto an outer surface of the intermediate tube.

During the vulcanizing process, the plastic or synthetic intermediate tube is deformed substantially without clearance or play in accordance with the external contour of the inner tube. After vulcanization, the intermediate tube is rotatable in a peripheral direction relative to the inner tube.

In accordance with a concomitant mode of the invention, there is provided a bonding agent being applied onto the outer surface of the intermediate tube for improving the bond with the vulcanized layer.

Other features which are considered as characteristic for the invention are set forth in the appended claims.

Although the invention is illustrated and described herein as embodied in a bearing bush and a method of manufacturing the bearing bush, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
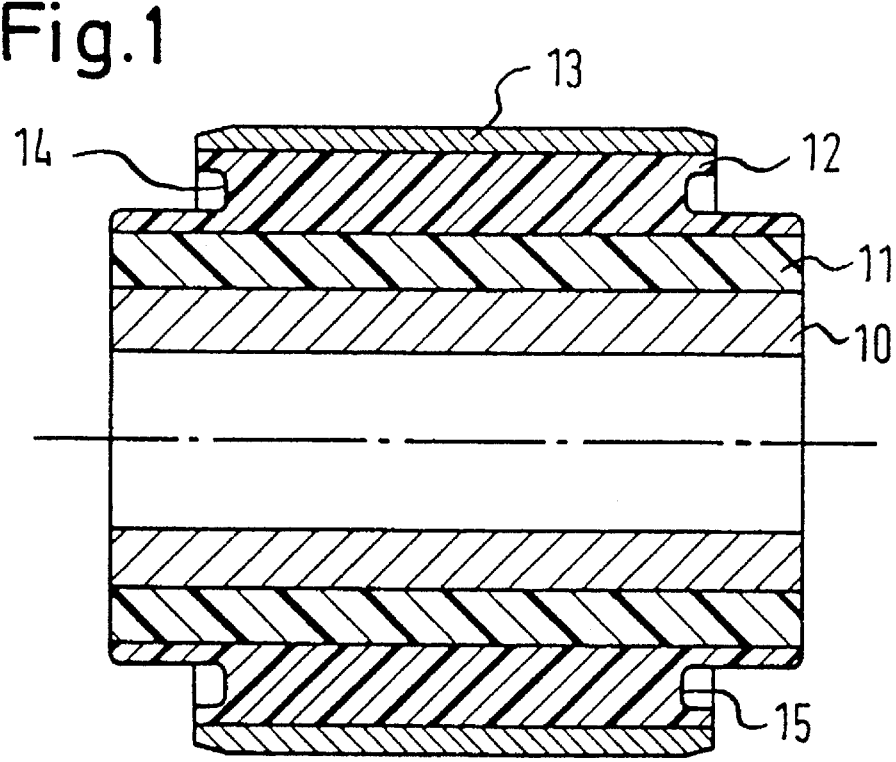
FIG. 1 is a diagrammatic, vertical-sectional view of a first embodiment of the bearing bush according to the invention.

Referring now in detail to FIGS. 1 to 4 of the drawing, in which identical reference numerals are used for identical or similar parts, and first, particularly, to FIG. 1 thereof, there is seen a bearing bush which has a cylindrical inner tube 10 made of metal. An intermediate tube 11 made of plastic or synthetic material rests without clearance or play against an outer periphery of the inner tube 10 and is rotatable in a circumferential direction relative to the inner tube 10. A vulcanized layer 12 is applied onto an outer surface of the intermediate tube 11, with a suitable bonding agent being usable to improve bonding properties.

The intermediate tube 11 is connected by the vulcanized layer 12 of rubber-elastic material to an outer tube 13 made of metal. Thus, in the event of torsional stressing of the bearing bush, this configuration permits a relative twisting of the intermediate tube 11 and of the outer tube 13 connected to the intermediate tube by the vulcanized layer 12. A peripheral groove 14, 15 is formed in opposing end surfaces of the vulcanized layer 12.

Figure 2:
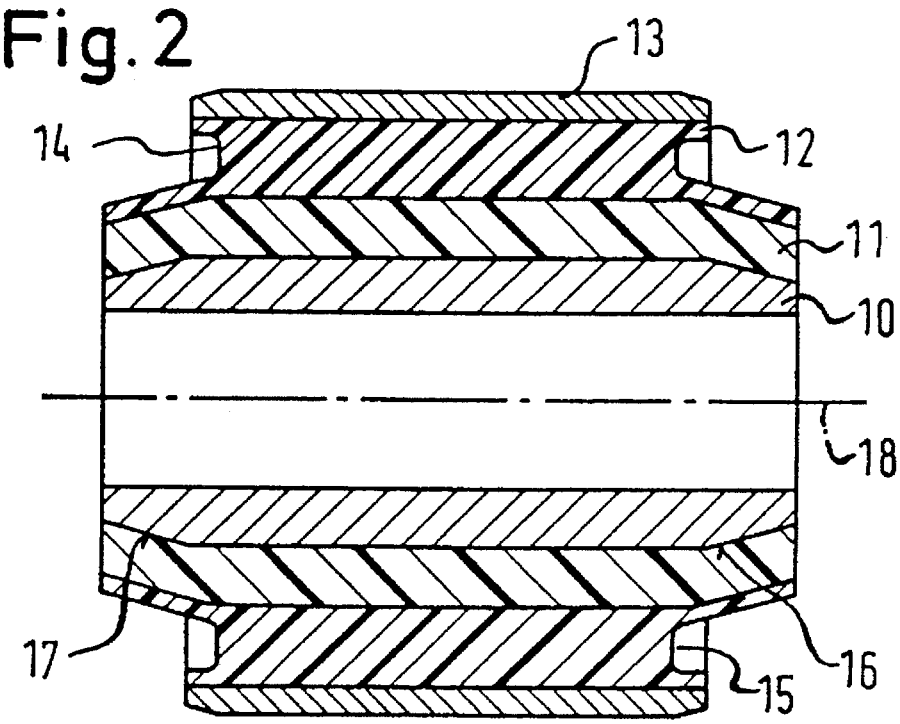
FIG. 2 is a vertical-sectional view of a second embodiment of the bearing bush according to the invention, in which an inner tube includes end bevels for axially locking an intermediate tube.

The bearing bush shown in FIG. 2 includes an inner tube 10 made of metal, which is provided at either end with bevels 16, 17 that converge in relation to a longitudinal axis 18 of the bearing bush. As is evident from FIG. 2, the intermediate tube 11 made of plastic or synthetic material rests without clearance or play against the bevels 16, 17. It is thereby guaranteed that the intermediate tube 11 and the outer tube 13 connected thereto by the vulcanized layer 12 is locked in an axial direction in relation to the inner tube 10. The intermediate tube 11 and the parts connected thereto are disposed rotatably relative to the inner tube 10 in a circumferential direction.

Figure 3:
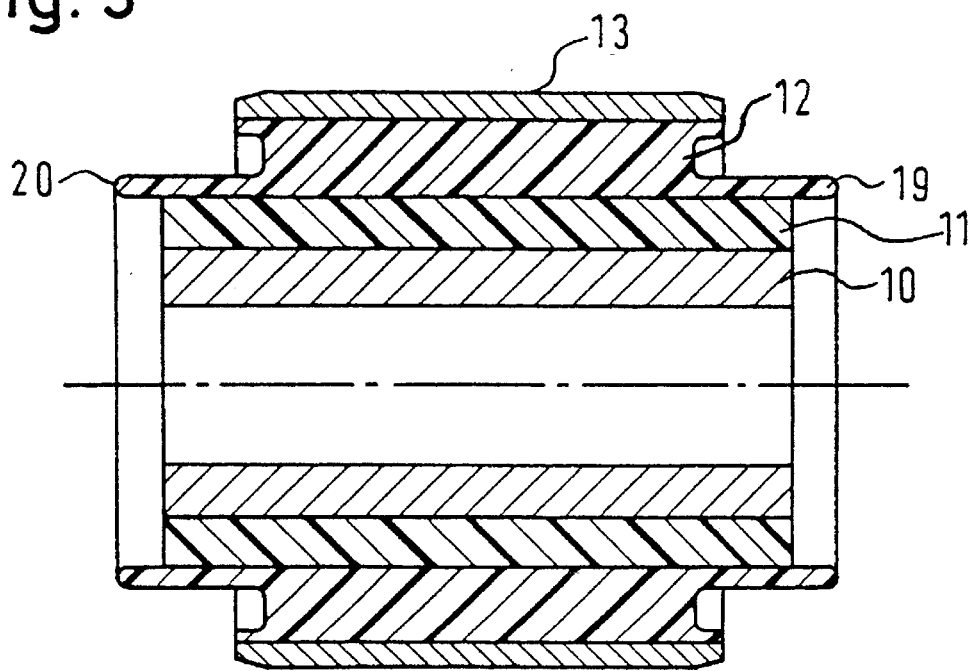
FIG. 3 is a vertical-sectional view of a third embodiment of the bearing bush according to the invention, in which a vulcanized layer includes sealing lips at either end.

The bearing bush shown in FIG. 3 has a similar construction to the bearing bush according to FIG. 1. Unlike the latter, the bearing bush according to FIG. 3 includes laterally projecting sealing lips 19, 20, which emanate from the vulcanized layer 12. As is evident from FIG. 3, the sealing lips 19, 20 project beyond an end region of the inner tube 10 and of the plastic or synthetic intermediate tube 11 resting against the inner tube.

Figure 4:
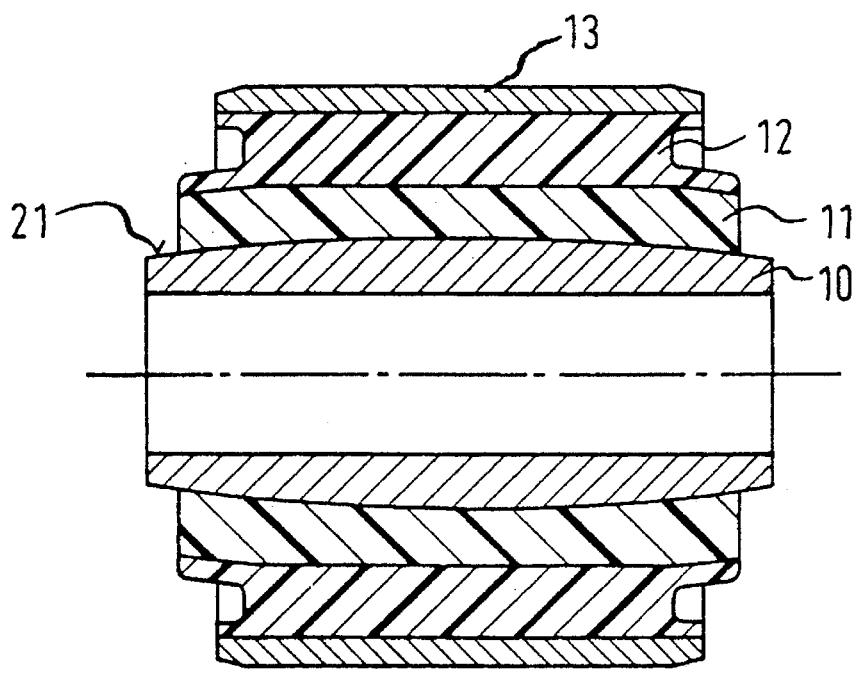
FIG. 4 is a vertical-sectional view of a fourth embodiment of the bearing bush according to the invention, in which the inner tube has a curved external contour in order to enable a cardanic deflection of the intermediate tube resting thereon and of parts connected thereto.

FIG. 4 shows a further embodiment of a bearing bush according to the invention, in which the metal inner tube 10 has a curved external contour 21. As FIG. 4 reveals, the plastic or synthetic intermediate tube 11 rests without clearance or play against the outer surface of the inner tube 10. The intermediate tube 11 is connected by the vulcanized layer 12 to the outer tube 13. The structure of the inner tube 10 with a curved external contour enables a cardanic deflection of the intermediate tube 11 resting against the inner tube 10 and of the parts connected to the intermediate tube.

Figure 5:
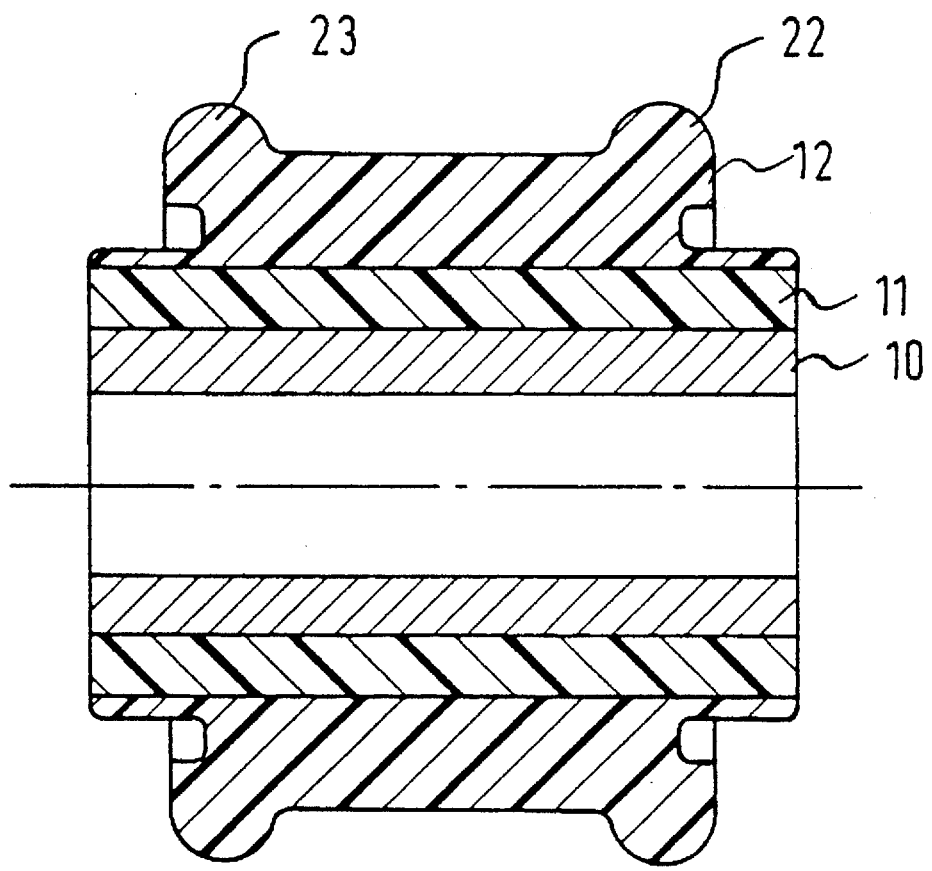
FIG. 5 is a vertical-sectional view of a further embodiment of the bearing bush according to the invention, in which no outer tube is provided.

FIG. 5 shows an embodiment in which no outer tube is provided. The inner surface of the cylindrical intermediate tube 11 rests slidingly against the inner tube 10. The intermediate tube 11 is vulcanized with a vulcanized layer 12 which is shaped in such a way as to allow it to be pressed directly into a receptacle or seat. To that end, lugs 22, 23 are formed on the vulcanized layer 12.

The following is a description of the method of manufacturing the bearing bushes illustrated in FIGS. 1 to 5. During manufacture, the metal inner tube 10 is inserted together with the plastic or synthetic intermediate tube 11 into a vulcanizing mold. During vulcanization, the plastic or synthetic intermediate tube 11 is pressed onto the metal inner tube 10. During the process, the inner surface of the plastic or synthetic intermediate tube 11 assumes the shape of the external contour of the metal inner tube 10. A bonding agent is applied onto the outer surface of the intermediate tube 11 to improve the bond with the vulcanized layer 12.

I claim:

1. A method of manufacturing a bearing bush, which comprises:

inserting an inner tube of metal and an intermediate tube of synthetic material resting against the inner tube and being slideable at least in a circumferential direction, into a vulcanizing mold together;

deforming the intermediate tube in accordance with an external contour of the inner tube during vulcanization; and applying a vulcanized layer onto an outer surface of the intermediate tube.

2. A method of making a motor vehicle bearing bush, comprising:

an inner tube of metal having an outer contour;

an intermediate tube of synthetic material resting against said inner tube so as to be slidable at least in a circumferential direction, said intermediate tube having an inner surface being shaped in accordance with said outer contour of said inner tube, and said intermediate tube having an outer surface; and a vulcanized layer being applied onto said outer surface of said intermediate tube; said method comprising; applying a bonding agent onto the outer surface of the intermediate tube, for improving a bond with the vulcanized layer.

* * * * *